3,649,702
ADAMANTANE DERIVATIVES
Richard E. Pincock, Edward Torupka, and William Bruce Scott, Vancouver, British Columbia, Canada, assignors to Canadian Patents and Development Limited, Ottawa, Ontario, Canada
No Drawing. Filed July 27, 1970, Ser. No. 58,656
Int. Cl. C07c *13/14*
U.S. Cl. 260—666 M      17 Claims

ABSTRACT OF THE DISCLOSURE

A reactive derivative of adamantane, 1,3-dehydroadamantane, I, its preparation and uses are described. The dehydro compound I may be substituted in the 5,7 positions by alkyl groups. I is a reactive monomer for polymerizations or a reactive intermediate for preparing substituted adamantanes.

---

The invention is in the field of synthetic organic compounds, in particular derivatives of the cyclic compound adamantane.

Adamantane (tricyclo[3.3.1.1$^{3,7}$]decane) is a symmetrical ten carbon compound arranged in three six-carbon rings with all rings equivalent and in the chain form. Adamantanes and their alkyl substituted derivatives result from the Lewis acid catalyzed isomerization of tricyclic hydrocarbons. For instance the isomerization of perhydroacenaphthene yields 1,3-dimethyladamantane. The labile (tertiary) hydrogen atoms at bridgehead positions in adamantane may be replaced with e.g. alkyl groups.

This invention relates to a novel, highly reactive derivative of adamantane, tetracyclo[3.3.1.1$^{3,7}$.0$^{1,3}$]decane, (I-trival name 1,3-dehydroadamantane), and a process for preparing I from adamantane compounds (II) containing two ore more halogen atoms in the bridgehead positions. In the case of di- and trihaloadamantanes, one or two alkyl groups may also be present at birdgehead positions thus giving rise to alkylated 1,3-dehydroadamantanes. Polymers from such alkylated monomers are described.

The structures of the starting materials and 1,3-dehydro compounds (products) may be illustrated as follows:

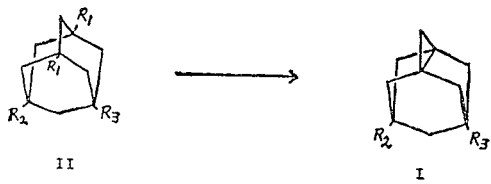

$R_1$ in the above formulae is halogen (preferably chlorine or bromine), and $R_2$ and $R_3$ are any substituent such as halogen, hydrogen, or alkyl. In the cases of the tri- and tetrahalogenated adamantanes, the reaction proceeds so as to produce only one cyclopropane ring—the extra halogen atoms are replaced by hydrogen. Alkyl groups in the 5 and 7 positions survive the reaction.

The general procedure for preparing 1,3-dehydroadamantanes involves the reaction of suitably halogenated derivatives of adamantane with an alkali or alkaline earth metal in an inert solvent at a temperature between about 10 and 100° C. (in the presence or absence of catalysts). Recovery of the product is preferably by vacuum sublimation following evaporation of the reaction solvent. The only by-product of the reaction is adamantane, or alkylated adamantanes in the case of alkylated haloadamantanes starting material, and amounts to about 5–15% of the total isolated product.

Of the halogens, chlorine and bromine are preferred for reasons of economy and ease of preparation of starting materials. Of these two, chlorine is preferred since it is less expensive; however, adamantanes brominated at the bridgehead positions are easily obtained.

The preferred solvent for the reaction in one which has a boiling point less than 100° C. at one atmosphere of pressure. Also it is unreactive towards alkali and alkaline earth metals, and the product 1,3-dehydroadamantanes. The possible choices, therefore, are limited to the lower boiling hydrocarbons and ethers. Of these the preferred solvent is diethtyl ether for the reasons that faster reaction times are obtained, the reactions can be conducted at ambient temperatures, and it is very easily removed by vacuum evaporation, thus minimizing entrainment of the product. Usually solutions containing from about 0.1–10% w./v. of the haloadamantanes may be used. The preferred concentration is 2–3%.

The alkali and alkaline earth metals, either singly or combined as alloys, may be used in the reaction. A preferred choice is the liquid sodium-potassium alloy (1:5 w./w.) because of its ease in handling and ready dispersability in the reaction mixture. An excess of the metal is usually used to aid completion of the reaction. The amount of metal or alloy used may desirably be from 0–600% in excess of the stoichiometric amount required based on the haloadamantane. A preferred amount is about 100% in excess.

In the cases of the dihalogenated starting materials, decreased reaction times are obtained, without loss of selectivity or yield, by adding small amounts of t-butanol and/or hexamethylphosphoramide. However the process is operative without such catalytic materials. The preferred process involves the addition of both compounds in identical amounts ranging from about 0.02–0.2% v./v. based on the reaction solvent. Less pronounced but still significant effects are produced when these compounds are present in the preparations of 1,3-dehydroadamantanes from the tri- and tetrahaloadamantanes.

The reaction temperature may conveniently be within the range 10–100° C. though higher or lower temperatures are possible. Room temperature is preferred. The parent and alkylated 1,3-dehydroadamantanes, although highly reactive, can be stored indefinitely at 0° C. both in the solid form and in degassed solutions. Short exposures of the solid to air can be permitted; however, long durations result in a reaction with oxygen to form polymeric 1,3-dioxyadamantane, trivially named poly (peroxyadamantane). On exposure to air solutions of 1,3-dehydroadamantane react quickly with oxygen forming the polyperoxide in quantitive yield; however, a free-radical inhibitor such as 2,6-di-t-butyl-p-cresol can be effectively employed as a stabilizer.

1,3-dihydroadamantane and its alkyl derivatives can be thermally polymerized in solid form to give polyadamantanes in quantitative yields. These polymers have high thermal stabilities and high melting points. In addition they are insoluble in all common solvents including ethers, alcohols, hydrocarbons, halogenated hydrocarbons, ketones, and esters. Polyadamantane, itself, can be extended with heavy white mineral oil to give a clear resin.

Novel adamantane polymers (according to the present invention) having substituted adamantane repeating units can be depicted by $$\{A \ldots X\}$$

where A is a 1,3-adamantylene or 5,7-dialkyl-1,3-adamantylene group, X when present is a 1,3-dioxy substituent, and at least one of the 5,7-dialkyl and X substituents is always present. The preferred polymers of this group are poly-1,3-(5,7-dimethyladamantane), poly (1,3-dioxyadamantane) and poly (1,3-dioxy-5,7-diamethyladamantane).

In addtion, the 1:1 "copolymer" of 1,3-dehydroadamantane and oxygen, poly (peroxyadamantane), gives adamantanes, e.g., 1-methoxy-, 1-acetoxy- and 1-phenyladamantanes, respectively.

As a further illustration of the utility of 1,3-dehydroadamantane and its alkyl derivatives, Lewis acids catalyse the addition of such substances as methanol, acetic acid, and benzene to the cyclopropyl group to form 1-substituted adamantanes, e.g., 1-methoxy,1-acetoxy- and 1-phenyladamantanes, respectively.

The following examples illustrate the invention more specifically. Examples 1 to 10 show how 1,3-dehydroadamantane and alkylated 1,3-dehydroadamantanes may be prepared from a variety of haloadamantanes. In each example the apparatus consisted of a four-necked round bottom flask fitted with a high speed stirrer, a nitrogen inlet, a reflux condenser topped with a Drierite (trademark) drying tube, and a stoppered neck for removal of samples. "L" grade nitrogen, dried through silica gel, was slowly passed into the flask during the reaction. Preparations described were conducted at room temperature (20–22° C.). Vapor phase chromatographic analyses of the products isolated by sublimation showed only 1,3-dehydroadamantane (DHA) and adamantane to be present in each case.

EXAMPLE 1

1,3-dehydroadamantane (DHA) from 1,3-dibromoadamantane in the presence of t-butanol To 1.0 g. of 1,3-dibromoadamantane in 50 ml. of anhydrous diethyl ether was added 0.92 g. of Na-K alloy (1:5 w./w. composition). The alloy was dispersed by high speed mixing, 50μl. of t-butanol were added, and the mixture was stirred until completion of the reaction. The simultaneous appearance of 1,3-dehydroadamantane and disappearance of 1,3-dibromoadamantane was monitored by vapor phase chromatography (VPC). The reaction was shown to be complete (100% conversion of 1,3-dibromoadamantane) in 2.5 hrs. The gas inlet, stirrer, and condenser were replaced with a vacuum sublimation assembly of the cold finger type. The diethyl ether was removed under vacuum at autogenous temperature. A Dry Ice-acetone mixture was then placed in the cold finger and the product mixture (1,3-dehydroadamantane/adamantane) sublimed at about 0.5 mm. pressure and 25–30° C. The yield was 0.32 g. (70%) of white solid. The product ratio was 2:1 DHA:adamantane by VPC analysis.

Fractionation of the product by VPC gave 1,3-dehydroadamantane as a white crystalline solid with characteristic infrared absorptions at 3040 (cyclopropyl C–H stretching), 2900, 1450, 1285, 1085 and 895 cm.$^{-1}$. Its NMR spectrum (in degassed benzene) showed absorptions at δ 2.73 (broad singlet, two protons), 2.05 (two protons), 1.66 (two protons) and 1.15, 191 (eight protons). The compound undergoes polymerization before its melting point is attained $C_{10}H_{14}$. Calc. mass, 134.1095. Found, 134.1086±0.001.

The 1,3-dehydroadamantane may be stored at 0° C. in evacuated sealed ampoules as a solid or a degassed solution, e.g. in heptane or benzene.

EXAMPLE 2

1,3-dehydroadamantane from 1,3-dibromoadamantane in the presence of hexamethylphosphoramide Example 1 was repeated using 1.0 g. of 1,3-dibromoadamane, 50 ml. of anhydrous diethyl ether, 0.52 g. of Na-K alloy and 25 μl. of hexamethylphosphoramide (HMPA). The reaction was complete in 5.5 hrs. and gave a yield of mixed products of 0.35 g. (77%). The product ratio was 9:1 DHA:adamantane.

EXAMPLE 3

1,3-dihydroadamantane from 1,3-dibromoadamantane in the presence of t-butanol and HMPA Example 1 was repeated using 1.0 g. of 1,3-dibromoadamantane, 50 ml. of anhydrous diethyl ether, 0.64 g. of Na-K alloy, and 25 μl. each of t-butanol and HMPA. The reaction was complete in 3.0 hrs. and gave a yield of mixed products (5:1 DHA:adamantane) of 0.36 g. (79%).

EXAMPLE 4

1,3-dehydroadamantane from 1,3-dichloroadamantane in the presence of HMPA

Example I was repeated using 1.0 g. of 1,3-dichloroadamantane, 0.65 g. of Na-K alloy, 50 ml. of diethyl ether, and 25 μl. of HMPA. The reaction was complete in about 7 hrs. and gave 0.39 g. (60%) of mixed products containing a ratio of DHA:adamantane of 5:1.

EXAMPLE 5

1,3-dehydroadamantane from 1,3-dichloroadamantane in the presence of t-butanol and HMPA Example 1 was repeated using 1.0 g. of 1,3-dichloroadamantane, 0.80 g. of Na-K alloy, 50 ml. of diethyl ether, and 25 μl. each of t-butanol and HMPA. The reaction was complete in 3.0 hrs., giving 0.50 g. (77%) of mixed products (DHA: adamantane, 10:1).

EXAMPLE 6

5,7-dimethyl-1,3-dehydroadamantane from 1,3-dichloro-5,7-dimethyladamantane in the presence of t-butanol and HMPA Example 1 was repeated using 1.0 g. of 1,3-dichloro-5,7-dimethyladamantane, 50 ml. of diethyl ether, 0.78 g. of Na-K alloy and 25 μl. each of t-butanol and HMPA. The reaction was complete in 2.0 hrs. giving 0.52 g. (75%) mixed products. (5,7 - dimethyl-1,3-dehydroadamantane:1,3 - dimethyladamantane, 10.1). Analytically pure 5,7 - dimethyl - 1,3 - dehydroadamantane had M.P. 41.5–43.0° C. and gave NMR absorptions at δ 1.93 (two protons), 1.47 (two protons), 0.91 (six protons) and 1.60–1.01 (eight protons).

EXAMPLE 7

5,7 - dimethyl-1,3-dehydroadamantane from 1,3-dibromo-5,7 - dimethyladamantane in the presence of t-butanol and HMPA Example 1 was repeated using 1.0 g. of 1,3-dibromo-5,7 - dimethyladamantane, 50 ml. of diethyl ether, 0.83 g. of Na-K alloy, and 25 μl. each of t-butanol and HMPA. The reaction was complete in 2.0 hrs. giving 0.35 g. (78%) of mixed products. (5,7 _ dimethyl - 1,3 - dehydroadamantane:1,3-dimethyladamantane, 1:1).

EXAMPLE 8

1,3-dehydroadamantane from 1,3,5-tribromoadamantane in the presence of t-butanol Example 1 was repeated using 1.5 g. of 1,3,5-tribromoadamantane, 50 ml. of diethyl ether, 1.03 g. of Na-K alloy, and 50 μl. of t-butanol. The reaction was complete in 2.5 hrs., giving 0.33 g. (61%) of mixed products (DHA: adamantane, 5:1).

EXAMPLE 9

1,3-dehydroadamantane from 1,3,5-tribromoadamantane in the presence of HMPA

Example 1 was repeated using 1.5 g. of 1,3,5-tribromoadamantane, 50 ml. of diethyl ether, 0.94 g. of Na-K alloy, and 25 μl. of HMPA. The reaction was complete in 2.5 hrs., giving 0.93 (72%) of mixed products (DHA: adamantane, 5:1).

EXAMPLE 10

1,3-dehydroadamantane from 1,3,5-tribromoadamantane in the presence of t-butanol and HMPA Example 1 was repeated using 1.5 g. of 1,3,5-tribromoadamantane, 50 ml. of diethyl ether, 0.95 g. of Na-K alloy, and 25 μl. each of t-butanol and HMPA. The reaction was complete in 1.5 hrs., giving 0.33 g. (61%) of mixed products (DHA: adamantane, 8:1).

EXAMPLE 11

Polymerization of 1,3-dehydroadamantane

Bulk polmerization of 1,3-dehydroadamantane was effected by heating an evacuated, sealed vial containing 0.68 g. of the solid material (crude 1,3-dehydroadamantane containing 16% adamantane) in an oil bath at 140° C. overnight. The material remained solid during the polymerization. Vacuum sublimation readily removed the adamantane (0.11 g.) from the product leaving 0.57 g. (100%) of polymer. The polymer was a friable white solid, which did not melt to 330° C. Differential scanning calorimetry also showed no phase transformations to 500° C. Some decomposition with yellowing of the sample occurred in air only at temperatures above 400° C.

Solubility studies on the polymer showed it to be insoluble in all common solvents including hydrocarbons, with and without halogen substituents, ethers, amides, ketones, alcohols and esters.

Polyadamantane gave characteristic infrared absorption at 2930, 2640, 1440, 1340, 1100, and 960 cm.$^{-1}$.

$(C_{10}H_{14})_n$.—Calc. (percent): C, 89.49; H, 10.51. Found (percent): C, 89.30; H, 10.51.

The rate of polymerization was found to be moderately influenced by temperature, e.g. at 160° C. the polymerization was complete within 10 min.

Heavy white mineral oil in amounts up to about 50 wt. percent could be incorporated into the polymer, either by polymerizing a mixture of oil and monomer or heating a mixture of oil and polymer, to give a clear yellowish resin. This material progressed from a brittle solid to a workable plastic with increasing concentration of oil.

EXAMPLE 12

Polymerization of 5,7-dimethyl-1,3-dehydroadamantane

Using the same procedure as in Example 11, 5,7-dimethyl-1,3-dehydroadamantane was thermally polymerized at 145° C. to give a polymer with the same physical and solubility characteristics. In this case, however, the polymer did not form a clear plastic with heavy white mineral oil.

$(C_{12}H_{20})_n$.—Calc. (percent): C, 88.82; H, 11.18. Found (percent): C, 88.94; H, 11.19.

EXAMPLE 13

Copolymerization of 1,3-dehydroadamantane with oxygen

A 0.05 M solution of 1,3-dehydroadamantane in heptane was exposed to the air at room temperature. The reaction was complete in 7 hrs. giving a white precipitate. This material was filtered off, washed with benzene and dried. Melting point determinations showed the product to have an explosion point ranging from 146–180° C. depending on heating rate. Elemental analysis of the product corresponded to poly(1,3-dioxyadamantane).

$(C_{10}H_{14}O_2)_n$.—Calc. (percent): C, 72.26; H, 8.49. Found (percent): C, 72.55; H, 8.28.

Reduction of the polymer with lithium aluminum hydride gave 1,3-dihydroxyadamantane as the major product.

Examples 14 to 16 illustrate the capability of 1,3-dihydroadamantane to add electrophilic reagents thus forming 1-substituted adamantanes.

EXAMPLE 14

Addition of benzene to 1,3-dehydroadamantane

A solution of 0.84 g. of 1,3-dehydroadamantane (containing 17.4% adamantane) in 300 ml. of dry benzene was treated with 2.0 g. of aluminum trichloride at 60° C. for 10 min. The solution was then cooled and 15 ml. of water were added. The mixture was extracted with 5% sodium bicarbonate solution. The organic phase was dried and evaporated, giving 0.44 g. (40%) of 1-phenyladamantane, M.P. 79–81. Polymeric material accounted for the remainder of the 1,3-dehydroadamantane.

EXAMPLE 15

Addition of methanol to 1,3-dehydroadamantane

To a solution of 0.74 g. of 1,3-dehydroadamantane (containing 18.7% adamantane) at room temperature was added about 0.2 ml. of boron trifluoride etherate. The reaction was complete within 2 min. as shown by VPC analysis. About 0.25 ml. of water was added to deactivate the boron trifluoride. The solution was then dried over anhydrous sodium sulfate, filtered, and diluted with methanol to 50.0 ml. in a volumetric flask. A VPC comparison of this solution with a standard solution of authenic 1-methoxyadamantane indicated that 0.69 g. (90%) of 1-methoxyadamantane had been produced along with 0.05 g. (6%) of an unidentified by-product.

EXAMPLE 16

Addition of acetic acid to 1,3-dehydroadamantane

One ml. of a 0.04 M solution of 1,3-dehydroadamantane in heptane under nitrogen was treated with 10μ l. of acetic acid at room temperature. VPC analysis of the solution showed essentially complete reaction of dehydroadamantane within 2 min. After 10 min. the yield of adamantyl acetate, by comparison to an authentic sample, was 85%.

We claim:

1. A compound having the structural formula $$R—A—R'$$

wherein
A is a 1,3-dehydro-5,7-adamantylene group, and R and R' are monovalent substituents selected from hydrogen and alkyl.

2. 1,3-dehydroadamantane.

3. 1,3-dehydro-5,7-dimethyladamantane.

4. A process for converting di-, tri- and tetrahalogenated adamantanes, the halogens being at bridgehead positions, to 1,3-dehydroadamantanes, comprising
   (a) admixing the halogenated adamantane, an alkali or alkaline earth metal and an inert solvent for the adamantanes,
   (b) reacting the mixture to dehalogenate the adamantane, and
   (c) separating from the reaction mixture a 1,3-dehydroadamantane.

5. The process of claim 4 wherein the halogenated adamantanes have one or two alkyl groups at bridgehead positions.

6. The process of claim 4 wherein the inert solvent is selected from the group consisting of liquid hydrocarbons and ethers.

7. The process of claim 4 wherein an alkali or alkaline earth metal alloy is used as reactant.

8. The process of claim 4 wherein a catalyst selected from t-butanol and hexamethylphosphoramide is present.

9. The process of claim 4 wherein the reaction temperature is within the range 10–100° C.

10. The process of claim 4 wherein the 1,3-dehydroadamantane is separated by vacuum sublimation after vacuum evaporation of the solvent.

11. The process of claim 4 wherein said alkali metal is sodium or potassium.

12. The process of claim 4 wherein said alkali metal is a 5:1 w./w. potassium-sodium alloy.

13. The process of claim 4 wherein said solvent is diethyl ether and the reaction temperature range is from about 15–36° C.

14. The process of claim 4 wherein said halogenated adamantane is selected from the group consisting of 1,3-dibromoadamantane; 1,3 - dibromo-5,7-dimethyladamantane; 1,3-dichloroadamantane; 1,3-dichloro-5,7-dimethyladamantane; 1,3,5-tribromoadamantane; and 1,3,5,7-tetrabromoadamantane.

15. The process of claim 4 wherein t-butanol is present in 0.02 to 0.2% v./v. concentration based on the amount of solvent.

16. The process of claim 4 wherein hexamethylphosphoramide is present in 0.02 to 0.2% v./v. concentration based on the amount of solvent.

17. The process of claim 4 wherein both t-butanol and hexamethylphoshoramide are present in 0.02 to 0.2% v./v. concentrations based on the amount of solvent.

References Cited
UNITED STATES PATENTS 3,342,880   9/1967   Reinhardt _____ 260—666 M PAUL M. COUGHLAN, Jr., Primary Examiner V. O'KEEFE, Assistant Examiner U.S. Cl. X.R.

280—2 H